United States Patent
Tune

(10) Patent No.: US 10,929,060 B2
(45) Date of Patent: Feb. 23, 2021

(54) DATA ACCESS REQUEST SPECIFYING ENABLE VECTOR

(71) Applicant: Arm Limited, Cambridge (GB)

(72) Inventor: Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 49 days.

(21) Appl. No.: 16/037,091

(22) Filed: Jul. 17, 2018

(65) Prior Publication Data

US 2020/0026461 A1 Jan. 23, 2020

(51) Int. Cl.
*G06F 3/06* (2006.01)
*G06F 12/06* (2006.01)

(52) U.S. Cl.
CPC .......... *G06F 3/0659* (2013.01); *G06F 3/0604* (2013.01); *G06F 3/0679* (2013.01); *G06F 12/06* (2013.01); *G06F 2212/1041* (2013.01)

(58) Field of Classification Search
CPC .... G06F 3/0659; G06F 3/0679; G06F 3/0604; G06F 12/06; G06F 2212/1041; G06F 12/0815; G06F 12/0802

USPC ......................................................... 711/103
See application file for complete search history.

(56) References Cited

U.S. PATENT DOCUMENTS

| | | | |
|---|---|---|---|
| 2002/0138689 A1* | 9/2002 | Ware | G11C 7/22 711/105 |
| 2008/0320476 A1* | 12/2008 | Wingard | G06F 12/0607 718/101 |

* cited by examiner

*Primary Examiner* — David Yi
*Assistant Examiner* — Zubair Ahmed
(74) *Attorney, Agent, or Firm* — Nixon & Vanderhye P.C.

(57) ABSTRACT

An integrated circuit comprises: a requesting node to issue a data access request specifying a target address and an enable vector comprising a plurality of enable indications each indicating whether a respective portion of a target address range starting at the target address is an active portion or an inactive portion, and a control node responsive to the data access request to control at least one destination node to service at least one data access transaction. Each data access transaction is associated with a respective portion of the target address range indicated as an active portion by the enable vector of the data access request.

13 Claims, 5 Drawing Sheets

DATA ACCESS REQUEST SPECIFYING ENABLE VECTOR

BACKGROUND

Technical Field

The present technique relates to the field of integrated circuits.

Technical Background

An integrated circuit may comprise a number of nodes communicating over a bus or interconnect, where a requesting node may issue a data access request for controlling a destination node to service a data access transaction. The data access transaction may specify an address and could be a read transaction for reading data from a location identified by the address or a write transaction for writing data to a location identified by the address.

SUMMARY

At least some examples provide an integrated circuit comprising: a requesting node to issue a data access request specifying a target address and an enable vector comprising a plurality of enable indications each indicating whether a respective portion of a target address range starting at the target address is an active portion or an inactive portion; and a control node responsive to the data access request to control at least one destination node to service at least one data access transaction, each data access transaction associated with a respective portion of the target address range indicated as an active portion by the enable vector of the data access request.

At least some examples provide a control node for an integrated circuit, comprising: interface circuitry to receive, from a requesting node, a data access request specifying a target address and an enable vector comprising a plurality of enable indications each indicating whether a respective portion of a target address range starting at the target address is an active portion or an inactive portion; and control circuitry responsive to the data access request to control at least one destination node to service at least one data access transaction, each data access transaction associated with a respective portion of the target address range indicated as an active portion by the enable vector of the data access request.

At least some examples provide a method for controlling data access transactions in an integrated circuit, comprising: receiving, from a requesting node of the integrated circuit, a data access request specifying a target address and an enable vector comprising a plurality of enable indications each indicating whether a respective portion of a target address range starting at the target address is an active portion or an inactive portion; and in response to the data access request, controlling at least one destination node to service at least one data access transaction, each data access transaction associated with a respective portion of the target address range indicated as an active portion by the enable vector of the data access request.

Further aspects, features and advantages of the present technique will be apparent from the following description of examples, which is to be read in conjunction with the accompanying drawings.

DESCRIPTION OF EXAMPLES

Figure 1:
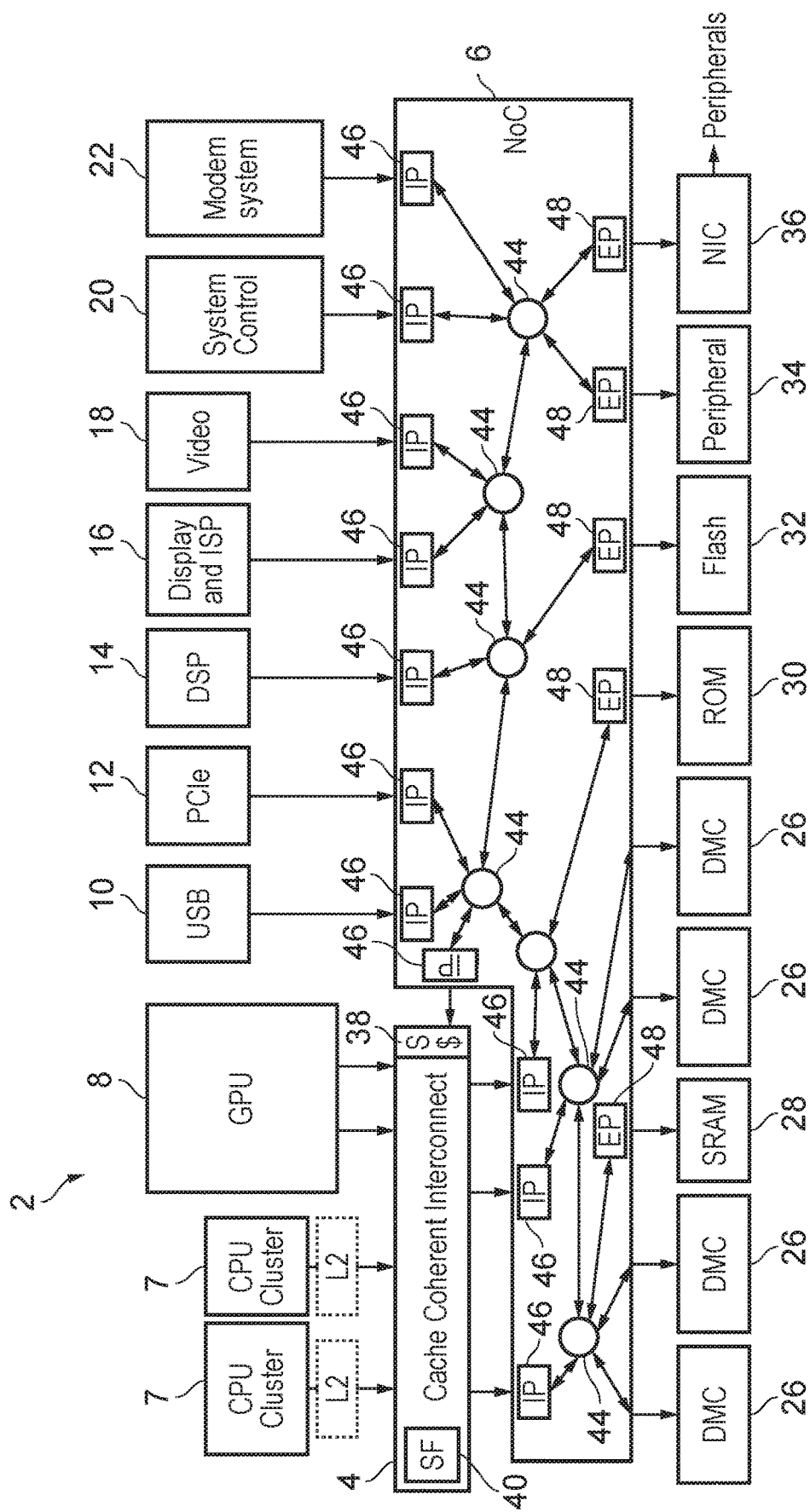
FIG. 1 schematically illustrates an example of an integrated circuit.

An integrated circuit includes a requesting node to issue a data access request specifying a target address and an enable vector which comprises a number of enable indications. Each enable indication of the enable vector indicates whether a respective portion of a target address range starting at the target address is an active portion or an inactive portion. A control node is responsive to the data access request to control at least one destination node to service at least one data access transaction. Each data access transaction triggered in response to the data access request is associated with a respective portion of the target address range indicated as an active portion by the enable vector of the data access request.

A challenge with modern integrated circuits is that as the frequency of operation of processing elements or other components of a typical system on-chip increases and the number of components integrated onto the same integrated circuit increases, the bandwidth required for issuing data access requests increases and the number of separate data access transactions required to be serviced in the integrated circuit may greatly increase. There may be a number of points on the integrated circuit where addresses of data access transactions have to be tracked, e.g. for the purpose of detecting address hazards or for managing coherency. As the number of transactions to be serviced increases, the tracking and comparison of addresses can become a significant frequency bottleneck.

One approach to addressing this issue can be to provide a format of data access request which allows multiple data access transactions to be triggered by a single request. One way to do this is to use a request format which specifies a contiguous range of address within which data access transactions are to be performed for each part of that contiguous range. For example, a burst request may request a certain number of data access transactions to contiguous regions of a memory address space. While this can reduce the number of requests on the data access request channel, it still requires relatively complex logic to compare the burst ranges specified by different requests to determine whether there is any overlap. Also, the inventor recognised that for data access traffic generated by a typical central processing unit (CPU) of a system on-chip, while there tends to be spatial locality in the address patterns generated by the CPU, so that it is common for requests issued close together in time to relate to nearby parts of the address space, in practice the sequence of addresses generated by the CPU is not entirely contiguous. For example, the CPU traffic may involve many adjacent addresses, but there may be some small gaps in the otherwise contiguous sequence of addresses, where certain addresses in the sequence are omitted. If a burst-based request format was used which only permits contiguous ranges of addresses to be specified in a single request, such address patterns involving gaps would require the burst to be separated at each gap, with separate requests issued either side of each gap, which can reduce the advantage of grouping transactions together in a burst request.

By using the request format discussed above, in which the data access request specifies an enable vector which specifies two or more enable indications each indicating whether a corresponding portion of a target address range starting at the target address is active or inactive, this enables a number of separate data access transactions to be triggered by one request, even if those transactions do not correspond to a fully contiguous address range. For example, the enable vector may be a multi-hot enable value which indicates the valid transactions corresponding to each of the portions of the target address range. Hence, this can enable the total number of data access requests to be reduced compared to burst format requests for patterns of address traffic which involve gaps. Also, the request format using the enable vector can make the logic for determining whether there is any address conflict between two different data access requests more efficient to implement in circuit hardware.

When the enable vector specifies at least two active portions of the target address range, the control node may control the at least one destination node to service two or more independent data access transactions, each data access transaction associated with one of the active portions indicated by the enable vector. The enable vector is capable of indicating that, in response to a single data access request, at least one destination node should service two or more data access transactions associated with non-contiguous portions of the target address range indicated as active portions by the enable vector. This would not be possible with a burst format which assumes that transactions are to be issued for each portion of a contiguous range.

In some implementations, the data access request specifying the enable vector may be assumed to map to a target address range of some fixed size.

However, in other examples the bus protocol may support a number of alternative sizes of the target address range specified by the data access request. The data access request may specify a size parameter indicative of the size of the target address range for that request, where that size is selected from among two or more sizes supported by the control node. Another advantage of the format of data access request using the enable vector is that this can allow the number of sizes required to be supported in the bus protocol to be reduced compared to alternative formats. This is because the enable vector itself may be used to vary the size of the address range across which valid data access transactions are to be performed, by indicating other portions of the target address range as inactive. In contrast, with a burst format of data access request the size parameter would need to distinguish every possible size of contiguous burst required. For example, a data access request specifying a particular size could be used to implement data access transactions over a smaller range than that size, by setting some of the enable indications to indicate inactive portions of the target address range having the specified size. By reducing the total number of different sizes that need to be specified in the size parameter, this can reduce the protocol complexity and the validation space to be tested for functional correctness when developing integrated circuits compliant with the bus protocol.

More particularly, in implementations having multiple sizes supported for the target address range, a data access request specifying a given size (other than a minimum size supported by the control node) may have each of the enable indications corresponding to a portion of the target address range which is of a size corresponding to a next smallest size of the two or more sizes supported by the control node. For example, if the data access request specifies an enable vector having a predetermined number of enable indications (e.g. 4 or 8), then each size other than the minimum size may correspond to a size which is a multiple of that predetermined number larger than the next smallest size in the range of sizes supported.

The integrated circuit may have an address tracking structure having a number of entries, where each entry specifies the target address and the enable vector for a previously received data access request. For example, the address tracking structure could be maintained by the control node. The address tracking structure could for example be a snoop filter maintained at a point of serialisation or home node of a coherent interconnect, or a data structure used for detecting address hazards for the purpose of maintaining ordering of respective data access transactions for example. In some cases the address tracking structure could be maintained within a memory controller or cache controller for controlling access to a related memory device or cache. Similarly a peripheral controller for controlling a peripheral could have such an address tracking structure. By representing received data access requests in the address tracking structure using the corresponding format to the received data access request itself, i.e. specifying the target address and the enable vector, this can enable more efficient logic for checking for address hazards or conflicts.

In particular, comparison circuitry may be provided to detect whether there is an address conflict between any data access transaction corresponding to a candidate data access request and any data access transaction corresponding to a previously received data access request tracked in the at least one address tracking structure, by comparing the target addresses and the enable vectors for the candidate data access request and the previously received data access request. Hence, in a single comparison operation the comparison circuitry is able to detect potential address conflicts between a number of separate data access transactions due to the representation of those data access transactions in a single request using the enable vector, which can reduce the frequency bottleneck associated with address tracking and hazarding.

When the candidate data access request and the previously received data access request specify target address ranges of the same size, then the comparison circuitry may detect that there is an address conflict when the target addresses of the candidate data access request and the previously received data access request are the same, and a result of applying a logical AND operation to the enable vectors of the candidate data access request and the previously received data access request is non-zero. In particular the logical AND operation may be much more efficient to implement for checking whether there are address conflicts between multiple sets of data access transactions corresponding to the candidate and previously received request, compared to conflict checking for requests represented using a contiguous burst format, for which a more complex operation may be needed to check whether the ranges of the bursts specified by the respective requests overlap. The case when the candidate and previously received data access requests specify target address ranges of the same size could arise either in a protocol which only supports one size for the target address range, in which case it may be implicit that any two requests specify target address ranges of the same size, or in protocols which do support multiple size options, when the size parameters specified by the candidate and previously received data access requests are the same.

In protocols which do support different size options for the target address range of a data access request, when the candidate and previously received data access requests specify different sizes of address range, the comparison circuitry may detect that there is an address conflict when the target address of one of the candidate data access request and the previously received data access request that specifies a smaller size of the target address range is within an active portion of the target address range indicated by the other of the candidate data access request and the previously received data access request which specifies a larger range of target address range.

The request protocol used may constrain the requesting node to issue the data access request with the target address being an aligned address which is aligned to an address size boundary. Typical memory systems may define certain address size boundaries at some granularity of numbers of addresses, for example aligned at a byte, half-word, word or double-word boundary. The request format using the enable vector does not require the target address to be an unaligned address, since even if the first address for which a data access transaction is to be serviced by a destination node is at an unaligned address, this can be indicated using an aligned target address and an enable vector in which at least the first enable indication corresponding to the aligned target address indicates that the corresponding portion of the target address range is inactive. By constraining the target address to be an aligned address, this means that the comparison between requests for the purpose of address tracking or hazarding can be simpler.

When multiple independent data access transactions are triggered at the destination node in response to the same data access request, responses to those data access transactions may need to be distinguished from one another by the requesting node. Hence, each data access transaction may require a separate transaction identifier. However, indicating each transaction identifier of the respective transactions corresponding to each active portion separately in the request would require many additional bits in each request which may incur extra circuit area as a wider communication channel would be needed.

A more efficient approach can be that the data access request specifies a base transaction identifier which is a single transaction identifier specified for the entire request. When the enable vector specifies at least two active portions of the target address range, at least one of the control node and the destination node may allocate different transaction identifiers to at least two independent data access transactions to be serviced by the destination node, each of the transaction identifiers derived from the base transaction identifier and the enable vector. For example each of the enable indications may be associated with a corresponding offset, and the transaction identifier for the data access transaction associated with a given active portion of the target address range may be obtained by adding the base transaction identifier and the offset associated with the particular enable indication which corresponds to that given active portion. For example, the offset for each enable indication could be a multiple of some value (such as 1), where the multiple selected is based on the position of the enable indication within the enable vector.

The control node which receives the data access request from the requesting node could be any of a variety of nodes of an integrated circuit at which data access requests are handled. For example, the control node could be home node in a coherent interconnect, where the home node is responsible for managing coherency between cached data at a number of requesting nodes. The control node could also be a memory controller or a peripheral controller, which controls access to a related memory device or peripheral device. Also the control node could be logic tightly coupled with a memory or peripheral device itself, e.g. the data access logic of a DRAM (dynamic random access memory) unit included in the integrated circuit.

In some implementations, the control node could split the data access request specifying the target address and the enable vector into a number of separate data access transactions and then route a number of separate transaction requests each corresponding to one of the data access transactions to one or more respective destination nodes. Hence, the control node could be the point at which the data access request is decomposed into individual transactions. Note that when the data access request specifies more than one active portion of the target address range, then different data access transactions for the respective active portions could target different destination nodes of the system, or multiple data access transactions could target the same destination node depending on the mapping of addresses to destination nodes being used.

In other examples, the control node could forward a request to a downstream node in the same format as which the data access request is received from the requesting node, so that the request sent downstream also includes a target address and an enable vector. The decomposition of the data access request into individual data access transactions may then happen at a downstream node, such as a further control node or the destination node itself. Hence the point at which the data access request is mapped to individual data access transactions can vary, and in general the control node may provide signals downstream which control one or more downstream nodes to ensure that at least one destination node services at least one data access transaction, with each data access transaction corresponding to an active portion indicated by the enable vector.

In some cases, the control node could also split a data access request specifying a target address and an enable vector for a larger size of target address range into further data access requests corresponding to a smaller size of target address range but which still use an enable vector to separately indicate the active portions of that smaller target address range for which valid data access transactions are required. For example some portions of a bus network on an integrated circuit may have a smaller maximum size of request than others, in which case there can be a resizing of the request format while still using a format using an enable vector for each of the resized requests. Similarly, different portions of a bus network could use request formats which use enable vectors with different numbers of enable indications. Hence, in some cases the control node could be a request resizing component of a bus network.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 7 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 7, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. In the arrangement shown in FIG. 1, the system interconnect 6 does not need to take responsibility for management of coherency between cache data in respective masters. However, in other examples, instead of providing a separate cache coherent interconnect 4 and system interconnect 6 as shown in FIG. 1, a single interconnect similar to the system interconnect 6 could be provided which connects each of the master and slave devices and also manages cache coherency.

In this example, the system interconnect 6 is implemented as a network on chip (NoC) which comprises a number of routers 44 for coupling a number of master interfaces 46 (from which data access requests, including read and write requests, can be received from respective master devices 7-22) to a number of destination interfaces 48 (for outputting the requests to respective destination devices 26-36). Each master interface 46 (also known as an ingress port, IP, or source endpoint) is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 (also known as egress ports, EP, or destination endpoints) may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, or along a different path, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Although FIG. 1 shows an example of a network for routing signals between master and slave devices within an integrated circuit, in other examples the devices connected by the interconnect may not have a master-slave relationship, but instead the devices could be connected by peer-to-peer connections. Also, in some examples some requests routed by the network may target a destination node within the interconnect itself, such as points of coherency or caches, rather than targeting a destination node outside the interconnect.

Figure 2:
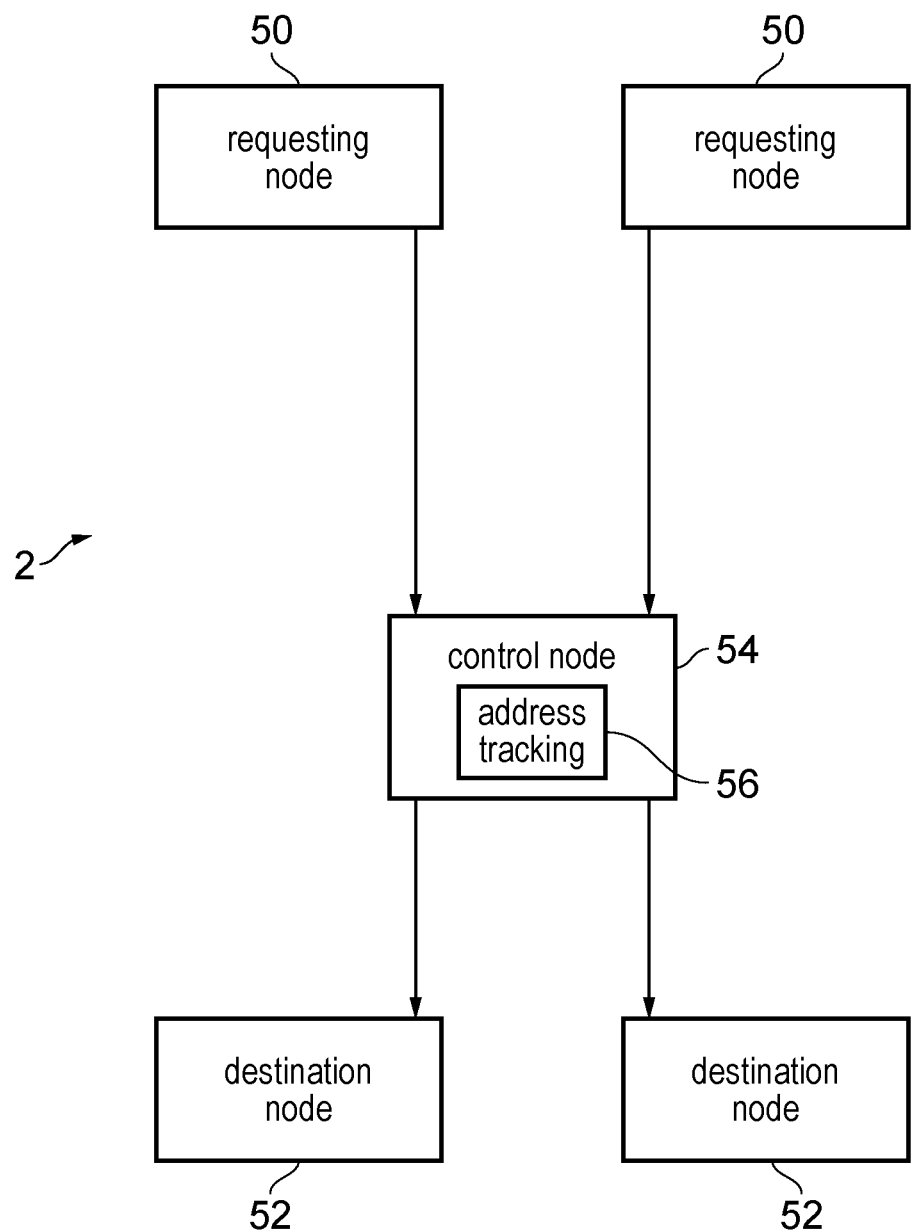
FIG. 2 shows an example of requesting nodes, destination nodes and a control node of the integrated circuit.

It will be appreciated that the example of FIG. 1 is just one embodiment and many other integrated circuits or system on-chips may include requesting nodes which request that data access transactions are serviced by destination nodes. FIG. 2 shows a generalised representation of such a integrated circuit 2 which includes a number of requesting nodes 50, a number of destination nodes 52 and a control node 54. The requesting nodes 50 could be any of the devices capable of issuing data access requests, such as elements 7, 8, 10, 12, 14, 16, 18, 20, 22 of FIG. 1. The destination nodes 52 can be any element of the system capable of servicing data access transactions (including read or write transactions), such as an internal destination node 38 within the bus fabric or one of the memory or peripheral devices 26, 28, 30, 32, 34, 36 in the example of FIG. 1. The control node 54 could for example be a point of coherency within the cache coherent interconnect 4, or a control unit such as a router 44 or ingress port 46 within the network on-chip 6, or could be a memory controller or peripheral controller associated with one of the destination nodes 26 to 36. While FIG. 2 shows a single control node 54, in other examples multiple control nodes may be provided. While FIG. 2 shows a single control node 54 controlling access to multiple destination nodes, this is not essential and some destination nodes may have their own dedicated control node which only controls access to that particular destination node.

The control node 54 may include address tracking circuitry 56 for tracking outstanding data access requests received from the requesting nodes 50 which have not yet received a response confirming that those requests have been serviced. In this context the term "serviced" does not necessarily imply that the actual read or write operation associated with a corresponding data access transaction has already been carried out. In some cases, a destination node may respond indicating that a request has been serviced once the corresponding data access transaction is committed to be performed, even though that transaction may not actually have been implemented in terms of actually writing the data to the required storage location. For example, a DRAM unit could respond confirming that a write transaction has been serviced once the data has been written into an internal buffer within the DRAM unit, with the data then being written from that buffer into the actual memory location involved at some later stage depending on the internal workings of the DRAM unit. Hence, a transaction is considered "serviced" when it has progressed to the point that it is guaranteed to be carried out.

Figure 3:
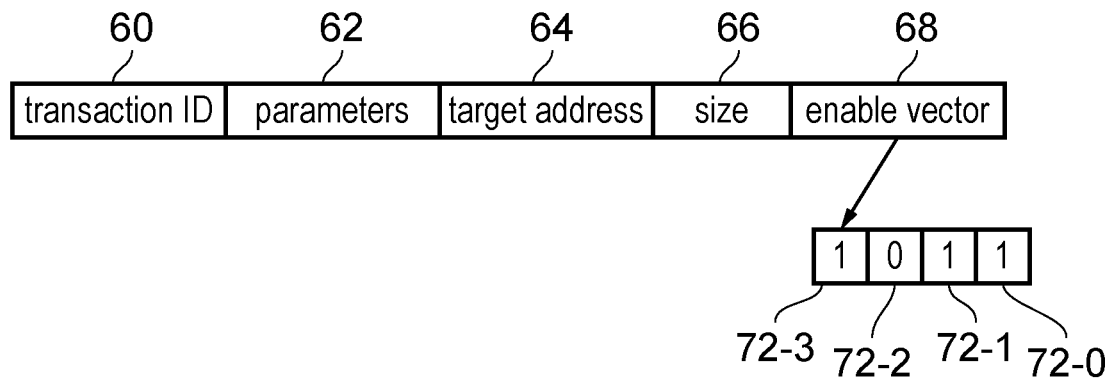
FIG. 3 shows an example of a data access request which specifies an enable vector.

FIG. 3 shows an example of a bus protocol format for a data access request issued by a requesting node 50 to the control node 54. The request specifies a transaction identifier 60, one or more transaction parameters 62 various properties of any transaction to be triggered by the request, (e.g. the properties may define whether the transactions are read or write transactions, or define ordering constraints imposed on the transactions), a target address 64, a size parameter 66 and an enable vector 68.

Figure 4:
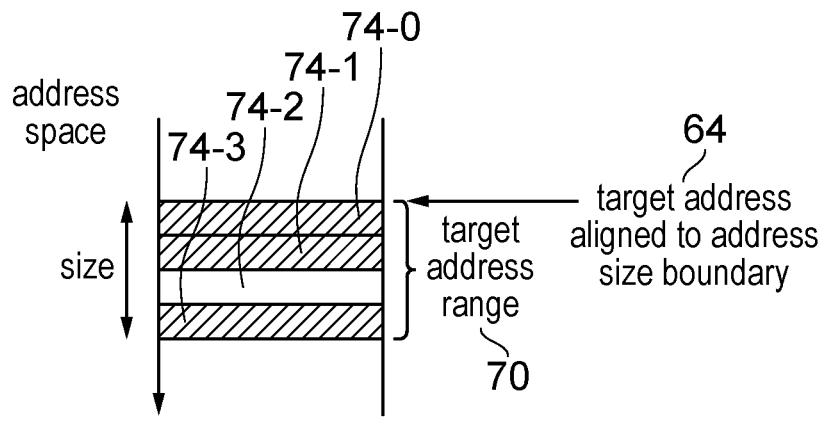
FIG. 4 schematically illustrates how the enable vector indicates whether respective portions of a target address range starting at a target address specified by the data access request are active or inactive.

FIG. 4 is a diagram explaining the meaning of some of the information specified by the data access request. The target address 64 is constrained to be an aligned address which is aligned to an address size boundary and indicates the start of a contiguous address range 70 referred to as the target address range of the data access request.

The enable vector 68 specifies a number of enable indications 72 which each correspond to a respective portion 74 of the target address range 70. For example, enable indication 72-0 may correspond to the first portion 74-0 of the target address range 70 which starts at the target address 64 itself, the next enable indication 72-1 may correspond to the next portion 74-1 of the target address range 70 which is contiguous with the first portion 74-0, and so on for the other enable indications, where each successive enable indication refers to another portion of the target address range 70. Of course, other mappings between the enable indications 72 of the enable vector 68 and the respective portions 74 of the target address range 70 could be used. When a given enable indication 72 is 1, then the corresponding portion 74 of the target address range 70 is an active portion for which a corresponding data access transaction is to be serviced by a destination node. When the enable indication 72 is 0 then the corresponding portion 74 is inactive, and no data access transaction needs to be serviced for that portion of the target address range. The enable vector is therefore able to indicate a number of different active portions which may be non-contiguous in the address space. For example, in FIG. 4 the portion 74-2 is indicated as inactive because the corresponding enable indication 72-2 is 0. This enables a number of transactions to be triggered by a single request even in cases where there are gaps in the sequence of addresses for which valid data access transactions are required.

The size parameter 66 indicates the size of the target address range 70. The size parameter 66 is not essential and in some versions of the protocol all requests could by default be issued to have some implicit size of the target address range 70. However by enabling different sizes of range to be specified this can enable more flexibility in allowing a single request to request data access transactions over larger ranges if possible. The sizes supported by the protocol may step up in powers of N, where N is the number of enable indications 72 included in the enable vector 68. For example the supported sizes could be as follows:

32-bit target address range (where each enable indication corresponds to an 8-bit portion of the target address range)

128-bit target address range (each enable indication corresponding to a 32-bit portion of the target address range)

64-byte target address range (each enable indication corresponding to a 16-byte (128-bit) portion of the target address range)

256-byte target address range (each enable indication corresponding to a 64-byte portion of the target address range).

Hence, in this example, for each size other than the minimum size, the size may correspond to N times the next smallest size (with N=4 in this example, where N corresponds to the number of enable indications in the enable vector). For a request having a given size of target range other than the minimum size, each enable indication 72 corresponds to a portion of the target range which has the same size as the next smallest size which can be specified for the target address range 70. There is no need to provide any intermediate sizes between these options, because such intermediate sizes can instead be represented using a larger total size for the target address range and a subset of the enable indications indicating that part of the target address range is inactive. For example, if transactions need to be performed within a 32-byte range, this could be done by specifying a total target address range size of 64 bytes, and setting the enable indications in one half of the enable vector to 0 to indicate inactive portions. While the examples above show an enable vector comprising 4 enable indications, other protocol implementations could provide more enable indications 72 in the enable vector 68 to enable finer granularity at which portions of the address range 70 can be marked as active or inactive.

Figure 5:
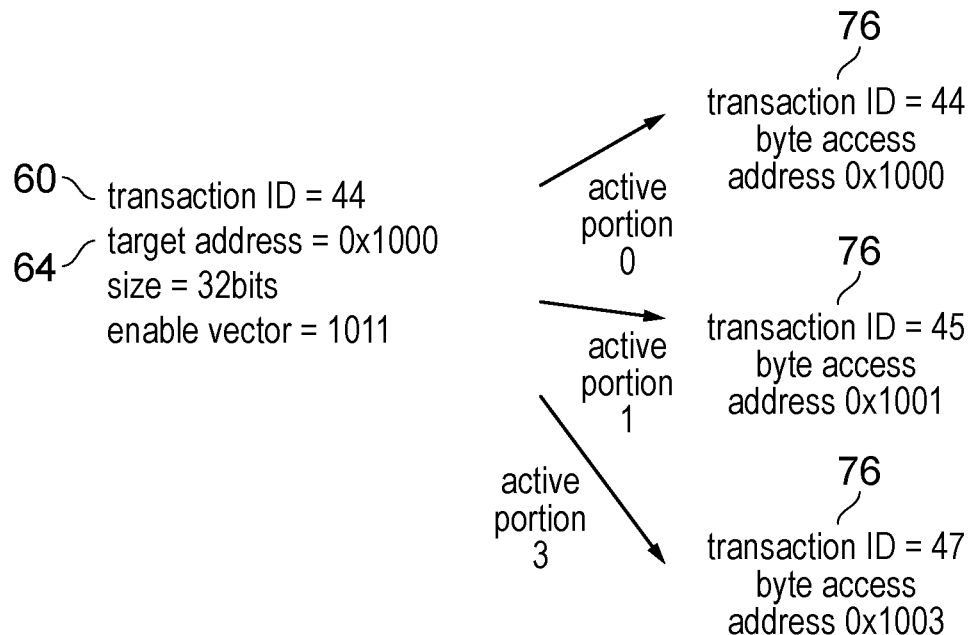
FIG. 5 shows an example of mapping the data access request to a number of separate data access transactions each corresponding to one of the active portions of the target address range indicated by the enable vector.

As shown in FIG. 5, the control node 54 or the relevant destination node 52 (in cases where the entire request corresponds to one destination node) may split the data access request into a number of separate transactions each corresponding to an active portion indicated by the enable vector. For example in the case where portion 74-2 is inactive, then no data access transaction is generated for that portion of the address space but a number of transactions are generated for portions 0, 1 and 3 which act on corresponding addresses derived by applying an offset to the target address 64. In this example, the size of the target address range 70 is 32-bits and the sizes of each individual transaction is 8-bits (1 byte) and so the offset for each transaction is a multiple of 1 byte. For example, the offset may simply be that byte offset multiplied by the position of the corresponding enable indication, e.g. the transaction for active portion 1 is offset from the target address by one times the byte offset, and the transaction for active portion 3 is offset by three times the byte offset relative to the target address. Similarly, the base transaction ID 60 specified in the data access request is mapped to a number of separate transaction IDs 76 for each individual transaction, where again a specific offset is applied to the base transaction ID in order to generate the corresponding transaction IDs for each individual transaction to be serviced by destination nodes. The transaction ID offset is selected based on the position of the corresponding enable indication 72. The parameters 62 specified in the data access request may be the same for each of the individual transactions serviced at the destination nodes. Hence if a number of data access transactions having different parameters are required, then separate data access requests would need to be issued by the requesting node 50.

Figure 6:
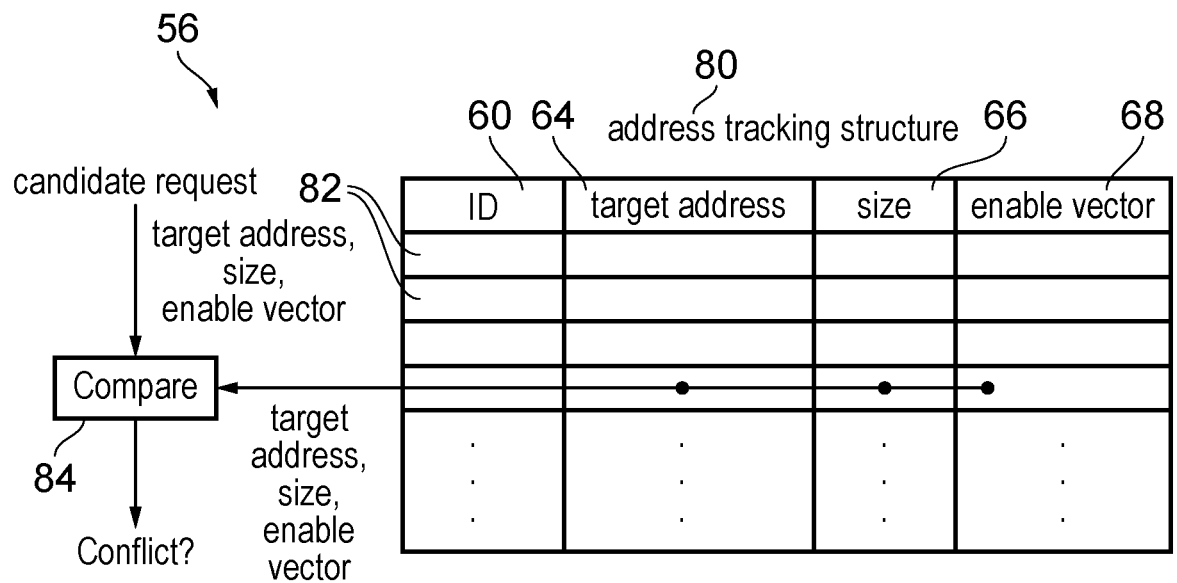
FIG. 6 shows an example of an address tracking structure.

FIG. 6 illustrates the address tracking circuitry 56 of the control node 54 in more detail. The address tracking circuitry includes an address tracking structure 80 which has a number of entries 82 for storing information on previously received data access requests, where each request is represented in the entry 82 using a corresponding format to the received request itself. Hence, each entry may specify the transaction identifier 60, the target address 64, the enable vector 68, and (if the protocol supports multiple sizes) the size parameter 66. The address tracking circuitry 56 has comparison circuitry 84 to compare the parameters specified in an entry 82 for a previously received request with corresponding parameters of a candidate request, which could be a request in another entry of the address tracking structure 80 or a recently received request received over a bus from the requesting node 50. Based on the comparison, the comparison circuitry 84 determines whether there is an address conflict between any of the one or more data access transactions represented by the candidate request and any of the one or mode data access transactions represented in the previously received data access request represented by the read entry 82 of the address tracking structure 80.

Hence, this organisation of the address tracking structure 80 means that information about more transactions can be stored in a smaller space when traffic patterns exhibit some spatial locality but do not necessarily include entirely sequential address accesses. This reduces the number of entries that we need to compare in order to detect a hazard and so allows a faster implementation (higher frequency) or alternatively allows a higher number of outstanding requests to be handled (and so higher bandwidth) when operating at a given frequency.

Figure 7:
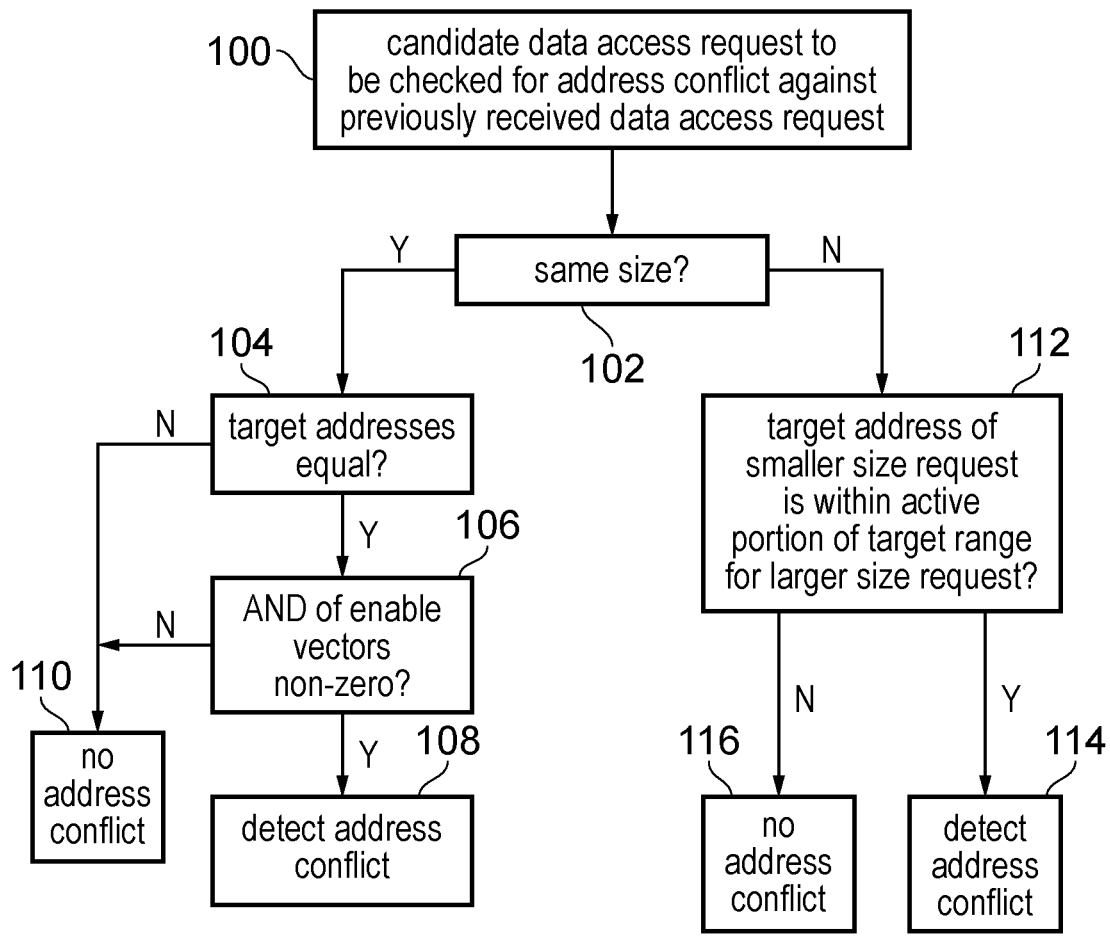
FIG. 7 is a flow diagram illustrating a method of detecting whether there is an address conflict between any data access transaction corresponding to a candidate data access request and any data access transaction corresponding to a previously received data access request.

FIG. 7 is a flow diagram illustrating a method of performing the checking for address conflicts. At step 100 a candidate data access request is received to be checked for address conflict against a previously received data access request from the address tracking structure 80. In response, at step 102 the comparison circuitry 84 determines whether the size 66 specified for the two requests is the same. If so then at step 104 the comparison circuitry 84 determines whether the target addresses 64 of the candidate and previously received requests are equal. Also at step 106 the comparison circuitry determines whether a logical AND of the enable vector 68 of the candidate and previously received request is non-zero. Steps 104 and 106 could be performed in parallel or sequentially (either in the order shown in FIG. 7 or in the reverse order). If the target addresses 64 are equal at step 104 and the logical AND of the enable vector 68 is non-zero at step 106, then at step 108 an address conflict is detected between the candidate data access request and the previously received data access request. If an address conflict is detected then operations may be performed for example to ensure that the conflicting transactions are handled in the same order in which the corresponding requests were received, or responses to the request or read data for the request could be merged to reduce the number of transactions that need to be serviced by the destination and reduce the bandwidth on the response channel for example. If either the target addresses are not equal at step 104, or the AND of the enable vectors is zero at step 106, then at step 110 the comparison circuitry 84 determines that there is no address conflict. Hence, for data access requests having the same size the address conflict checking operation is simple to implement in logic since the AND at step 106 can be implemented with simple AND gates, avoiding the need for more complex logic for comparing potentially overlapping ranges of addresses.

If at step 102 it is determined that the candidate and previously received data access requests are of different sizes then at step 112 the comparison circuitry 84 determines whether the target address of the smaller size request is within the active portion of the target address range for a larger size request of the candidate and previously received requests. For example, the target address of the smaller size request could be partially masked at the least significant end, with the masking applied to a number of bits determined based on the size of the range specified for the larger size request, and then the masked target address for the smaller size request could be compared with the target address at the larger size request and if they are equal then it may also be determined whether the masked out bits of the target address of the smaller size request corresponds to the position of one of the enable indications indicated as active in the enable vector 68 of the larger size request. If a target address of the smaller size request does map to an active portion of the target range specified for the larger size request then at step 114 the comparison circuitry 4 detects an address conflict, while otherwise at step 116 no address conflict is detected between the candidate and previously received data access requests.

Hence, as the request message from a requesting node indicates an always-aligned container of addresses that includes up to N independent data transfers (e.g. N may equal 4), where the N independent transfers may be to non-contiguous addresses, and a multi-hot word enable vector 68 indicates the valid transactions, this allows address tracking structures 80 (such as a point of serialisation queue in a home node) to be organised in a similar way, and the critical lookup can be made simply by comparing the address of the container with an address of an earlier request and ANDing the enable vectors 68, which enables efficient circuit logic to be used.

It will be appreciated that the address tracking structure of FIG. 6 is just one example, and in practice other information could also be stored for each request. For example, each entry 82 of the address tracking structure could include a further field to indicate a transaction state for each of the transactions corresponding to the request tracked by that entry. For example, the entry 82 may specify a state vector which includes a number of fields, each field of the state vector corresponding to one of the enable indications of the enable vector 68 and indicating the transaction state for the transaction corresponding to the corresponding enable indication when the enable indication specifies an active transaction. For example, the transaction state could indicate which of relevant points in its progress through the memory system has been reached by the transaction, e.g. whether the transaction request has yet been forwarded to downstream components of the memory system, whether a response to the transaction has yet been received, etc. Where the address tracking structure includes an indication of transaction state, the hazard checking operation of FIG. 7 may need to consider the transaction state. For example, some types of hazard check may only be relevant for transactions which have a certain transaction state or a one of a certain group of transaction states. Hence, the method of FIG. 7 may include additional tests to check whether the transaction state is relevant to the hazard check, and the address conflict may in some cases be detected only when the transaction state(s) of the candidate data access request and/or the previously received data access request meet certain conditions.

Figure 8:
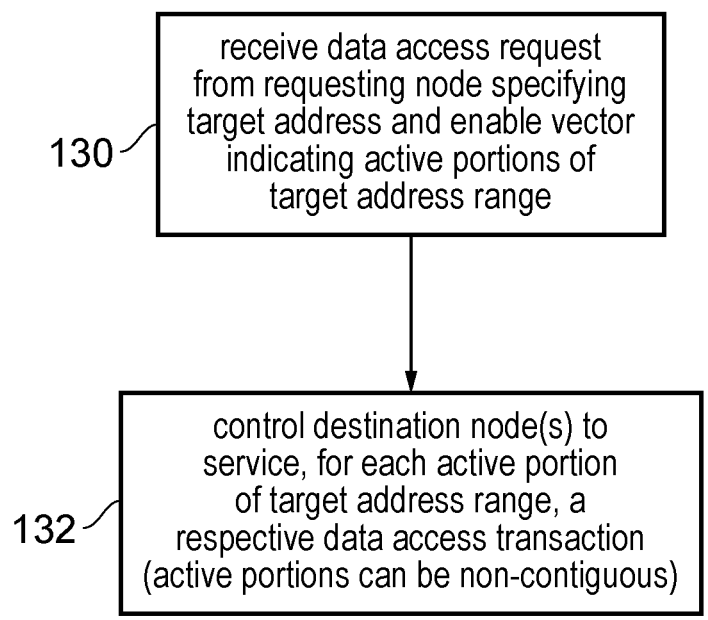
FIG. 8 is a flow diagram illustrating a method of handling data access requests in an integrated circuit.

FIG. 8 illustrates a flow diagram showing a method of handling data access requests according to the protocol shown in FIG. 3. At step 130 the control node 54 receives a data access request from a requesting node 50 which specifies a target address 64 and an enable vector 68, where the enable vector includes a number of enable indications 72 each indicating active portions 74 of the target address range 70. In response, at step 132 the control node 54 controls one or more destination nodes 52 to service, for each active portion of the target address range indicated by the enable vector 68, a respective data access transaction. The data access transaction could be a read transaction, a write transaction, or an atomic transaction which involves both read and write responses. The active portions indicated by the enable vector may be non-contiguous, so that even if there are some gaps in the addresses for which data transactions are required, each of the non-contiguous regions of the address space can have data access transactions triggered by the same request from the requesting node 50.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An integrated circuit comprising:
a requesting node to issue a data access request specifying a target address and an enable vector comprising a plurality of enable indications directly encoded in specified bits of the data access request, each of the enable indications indicating whether a respective portion of a target address range starting at the target address is an active portion or an inactive portion;
wherein the enable indications are directly encoded in specified bits of the data access request; and
a control node responsive to the data access request to control at least one destination node to service at least one data access transaction, each data access transaction associated with a respective portion of the target address range indicated as an active portion by the enable vector of the data access request; wherein
the data access request specifies a base transaction identifier; and
when the enable vector specifies at least two active portions of the target address range, at least one of the control node and the at least one destination node is configured to allocate different transaction identifiers to at least two independent data access transactions to be serviced by the at least one destination node, each of the transaction identifiers derived from the base transaction identifier and the enable vector.

2. The integrated circuit according to claim 1, in which when the enable vector specifies at least two active portions of the target address range, the control node is configured to control the at least one destination node to service a plurality of independent data access transactions, each data access transaction associated with one of the active portions.

3. The integrated circuit according to claim 1, in which the enable vector is capable of indicating that, in response to a single data access request, the at least one destination node should service a plurality of data access transactions associated with non-contiguous portions of the target address range indicated as active portions by the enable vector.

4. The integrated circuit according to claim 1, in which the data access request specifies a size parameter indicative of a size of the target address range selected from among a plurality of sizes supported by the control node.

5. The integrated circuit according to claim 1, comprising an address tracking structure comprising a plurality of entries, each entry specifying the target address and the enable vector for a previously received data access request.

6. The integrated circuit according to claim 5, comprising comparison circuitry to detect whether there is an address conflict between any data access transaction corresponding to a candidate data access request and any data access transaction corresponding to a previously received data access request tracked in the at least one address tracking structure, by comparing the target addresses and the enable vectors for the candidate data access request and the previously received data access request.

7. The integrated circuit according to claim 6, in which when the candidate data access request and the previously received data access request specify target address ranges of the same size, the comparison circuitry is configured to detect that there is an address conflict when:
the target addresses of the candidate data access request and the previously received data access request are the same; and a result of applying a logical AND operation to the enable vectors of the candidate data access request and the previously received data access request is non-zero.

8. The integrated circuit according to claim 6, in which when the candidate data access request and the previously received data access request specify target address ranges of different sizes, the comparison circuitry is configured to detect that there is an address conflict when the target address of one of the candidate data access request and the previously received data access request specifying a smaller size of target address range is within an active portion of the target address range indicated by the other of the candidate data access request and the previously received data access request specifying a larger size of target address range.

9. The integrated circuit according to claim 1, in which the requesting node is constrained to issue the data access request with the target address aligned to an address size boundary.

10. The integrated circuit of claim 1, in which each of the enable indications is associated with a corresponding offset, and said at least one of the control node and the destination node is configured to determine the transaction identifier for the data access transaction associated with a given active portion of the target address range by adding the base transaction identifier and the offset associated with the enable indication corresponding to said given active portion.

11. The integrated circuit of claim 1, in which the control node comprises at least one of:
a home node;
a memory controller; and
a peripheral controller.

12. An integrated circuit comprising:
a requesting node to issue a data access request specifying a target address and an enable vector comprising a plurality of enable indications directly encoded in specified bits of the data access request, each of the enable indications indicating whether a respective portion of a target address range starting at the target address is an active portion or an inactive portion;
wherein the enable indications are directly encoded in specified bits of the data access request and
a control node responsive to the data access request to control at least one destination node to service at least one data access transaction, each data access transaction associated with a respective portion of the target address range indicated as an active portion by the enable vector of the data access request; wherein
the data access request specifies a size parameter indicative of a size of the target address range selected from among a plurality of sizes supported by the control node; and for a data access request specifying a given size of said plurality of sizes other than a minimum size supported by the control node, each of the enable indications corresponds to a portion of the target address range of a size corresponding to a next smallest size of said plurality of sizes supported by the control node.

13. A control node for an integrated circuit, comprising:
interface circuitry to receive, from a requesting node, a data access request specifying a target address and an enable vector comprising a plurality of enable indications directly encoded in specified bits of the data access request, each of the enable indications indicating whether a respective portion of a target address range starting at the target address is an active portion or an inactive portion;
wherein the enable indications are directly encoded in specified bits of the data access request; and
control circuitry responsive to the data access request to control at least one destination node to service at least one data access transaction, each data access transaction associated with a respective portion of the target address range indicated as an active portion by the enable vector of the data access request; wherein
the data access request specifies a base transaction identifier; and
when the enable vector specifies at least two active portions of the target address range, the control node is configured to allocate different transaction identifiers to at least two independent data access transactions to be serviced by the at least one destination node, each of the transaction identifiers derived from the base transaction identifier and the enable vector.

* * * * *